US012666059B2

(12) United States Patent　　　(10) Patent No.:　US 12,666,059 B2
Kossentini et al.　　　　　　　　　(45) Date of Patent:　Jun. 23, 2026

(54) BIT-RATE-BASED VARIABLE ACCURACY LEVEL OF ENCODING

(71) Applicant: Intel Corporation, Santa Clara, CA (US)

(72) Inventors: Faouzi Kossentini, Vancouver (CA); Hassen Guermazi, St-Bruno-de-Montarville (CA); Chekib Nouira, Mission (CA); Phoenix Worth, Delta (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/954,318

(22) Filed: Sep. 27, 2022

(65) Prior Publication Data

US 2023/0012862 A1　　Jan. 19, 2023

Related U.S. Application Data

(60) Provisional application No. 63/352,859, filed on Jun. 16, 2022.

(51) Int. Cl.
| | |
|---|---|
| *H04N 19/184* | (2014.01) |
| *H04N 19/119* | (2014.01) |
| *H04N 19/124* | (2014.01) |
| *H04N 19/164* | (2014.01) |
| *H04N 19/42* | (2014.01) |
| *H04W 64/00* | (2009.01) |
| *H04W 74/06* | (2009.01) |
| *H04W 74/0808* | (2024.01) |
| *H04W 84/12* | (2009.01) |

(52) U.S. Cl.
CPC ......... *H04N 19/184* (2014.11); *H04N 19/119* (2014.11); *H04N 19/124* (2014.11); *H04N 19/164* (2014.11); *H04N 19/42* (2014.11); *H04W 64/006* (2013.01); *H04W 74/06* (2013.01); *H04W 74/0808* (2013.01); *H04W 84/12* (2013.01)

(58) Field of Classification Search
CPC .................................................. H04N 19/184
USPC ..................................................... 375/240.03
See application file for complete search history.

(56) References Cited

U.S. PATENT DOCUMENTS

| | | | | |
|---|---|---|---|---|
| 2005/0091041 | A1* | 4/2005 | Ramo ..................... | G10L 19/24 |
| | | | | 704/E19.044 |
| 2021/0335378 | A1* | 10/2021 | Liang ..................... | G10L 19/24 |
| 2022/0256169 | A1* | 8/2022 | Siddaramanna ....... | G06N 3/045 |
| 2023/0377338 | A1* | 11/2023 | Chaurasia .............. | G06V 10/26 |

* cited by examiner

*Primary Examiner* — Yulin Sun

(74) *Attorney, Agent, or Firm* — Hanley, Flight & Zimmerman, LLC

(57) ABSTRACT

This disclosure describes systems, methods, and devices related to bit-rate-based variable accuracy level encoding. A device may generate a list of encodes based on pairs of resolutions and quantization parameters (QP) associated with one or more video segments received from a source. The device may generate an estimated bit rate associated with the one or more video segments based on an analysis of the one or more video segments. The device may utilize an accuracy level of encoding for an encoder based on the estimated bit rate. The device may encode the one or more video segments based on the accuracy level of encoding.

20 Claims, 11 Drawing Sheets

Original video content (shot/clip/segment)

First Pass -> Rate Prediction

Employ For Each Shot Different Encoding Settings That Correspond To Rate Prediction Encoder Core at Accuracy Level Encoder Accuracy Level Selection

421

Final Bitstream

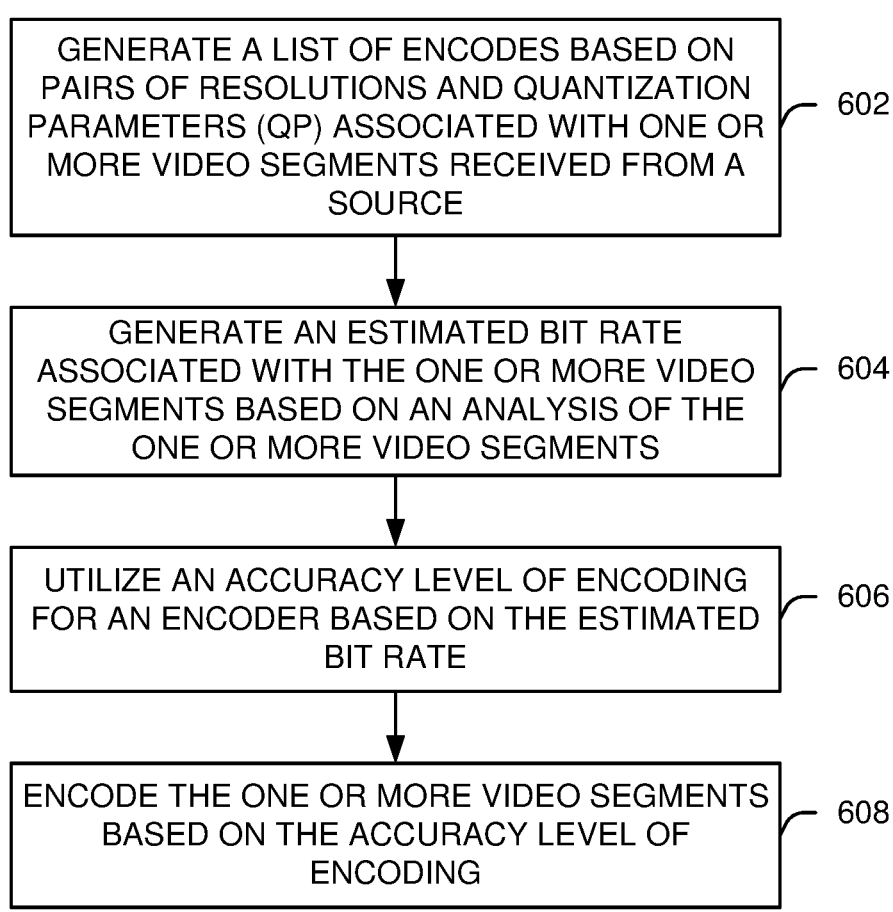

600

GENERATE A LIST OF ENCODES BASED ON PAIRS OF RESOLUTIONS AND QUANTIZATION PARAMETERS (QP) ASSOCIATED WITH ONE OR MORE VIDEO SEGMENTS RECEIVED FROM A SOURCE — 602

GENERATE AN ESTIMATED BIT RATE ASSOCIATED WITH THE ONE OR MORE VIDEO SEGMENTS BASED ON AN ANALYSIS OF THE ONE OR MORE VIDEO SEGMENTS — 604

UTILIZE AN ACCURACY LEVEL OF ENCODING FOR AN ENCODER BASED ON THE ESTIMATED BIT RATE — 606

ENCODE THE ONE OR MORE VIDEO SEGMENTS BASED ON THE ACCURACY LEVEL OF ENCODING — 608

FIG. 6

BIT-RATE-BASED VARIABLE ACCURACY LEVEL OF ENCODING

CROSS-REFERENCE TO RELATED APPLICATION(S)

This application claims the benefit of U.S. Provisional Application No. 63/352,859, filed Jun. 16, 2022, the disclosure of which is incorporated herein by reference as if set forth in full.

TECHNICAL FIELD

This disclosure generally relates to systems and methods for wireless communications and, more particularly, to bit-rate-based variable accuracy level encoding.

BACKGROUND

Video coding can be a lossy process that sometimes results in reduced quality when compared to original source video. Video coding standards are being developed to improve video quality.

BRIEF DESCRIPTION OF THE DRAWINGS

FIG. 6 illustrates a flow diagram of a process for an illustrative bit-rate-based variable accuracy level encoding system, in accordance with one or more example embodiments of the present disclosure.

Figure 1:
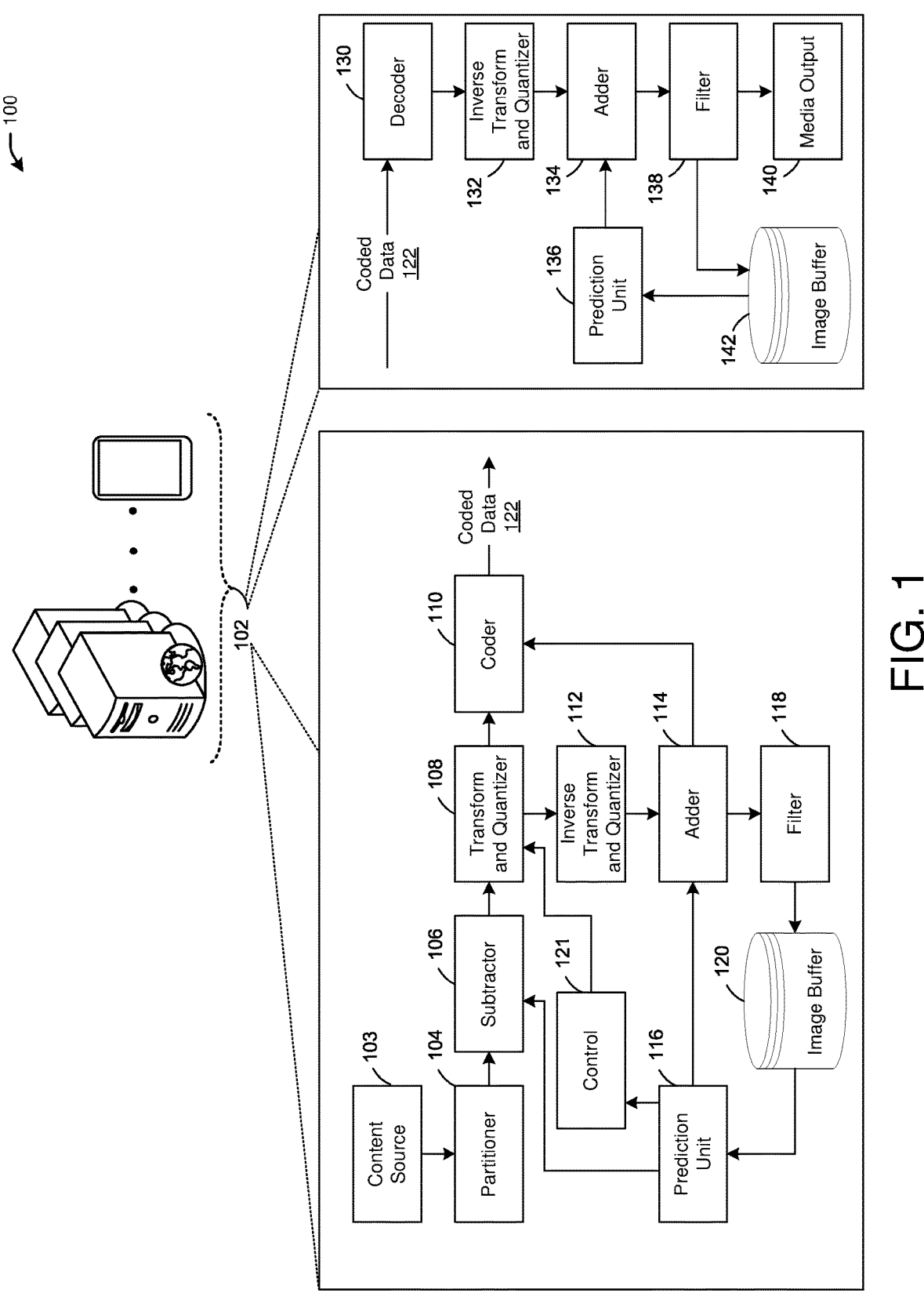
FIG. 1 depicts an example system illustrating components of encoding and decoding devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Constant-preset encoding is used in many video applications to achieve application-specific tradeoffs between video quality and encoding complexity. However, such encoding is very inefficient because using the same encoding settings for all input video would yield generally bad quality-complexity tradeoffs. For example, using the most-advanced prediction techniques as part of a high-quality-preset encoder for 1080p encoding at 15 Mbps would usually be both very costly in cycles and ineffective in improving the rate-distortion tradeoffs at such a high bit rate. On the other hand, employing a fast-preset encoder for 240p encoding at 200 Kbps would likely hurt video quality substantially without much savings in encoding cycles. Therefore, substantially better tradeoffs could be achieved by allowing the encoder to employ different encoding settings for each video shot/segment/clip, or each group of pictures, or each picture, based on the estimated (or expected) bit rate. This can be achieved through the use of first-pass information on bit rate in a convex-hull-optimized encoder, or a multi-pass encoder, or even a single-pass encoder.

This disclosure presents simple techniques that would allow us to achieve 10-25% savings in encoding cycles (for the same quality levels), depending on the type of video applications.

Many techniques have been developed that would improve the tradeoffs between quality and encoding complexity, giving rise to multiple presets that are supported by most current video encoders. However, such encoders usually employ constant-preset encoding settings in an effort to meet the tradeoffs of the target applications. A more recent solution involves the use of higher-quality presets for lower resolutions.

The main disadvantage of the afore-mentioned solutions is that they would involve constant-preset encoding, or limited variable-preset encoding based on resolution. Such encoding would not take into account the encoding bit rate, which depends not only on resolution, but also on content complexity and used QP values. For example, for very-fast varying video content and very low quantization parameter (QP) values, the number of encoding cycles could be huge even for low-resolution videos.

Example embodiments of the present disclosure relate to systems, methods, and devices for bit-rate-based variable accuracy level encoding.

In one embodiment, a bit-rate-based variable accuracy level encoding system may take advantage of the different resolution, QP, and content characteristics of different video shots (or segments, or clips) effectively through one parameter: the bit rate. The bit rate of a higher-resolution version of a video shot is usually higher than that of a lower-resolution version of the same shot. The same applies for lower QPs, where the bit rate would usually be larger than that of a higher-QP encode. Moreover, for a given (resolution, QP) pair, a video shot with higher content complexity would be less predictable, requiring a larger number of non-zero coefficients, or equivalently, a higher bit rate. Regardless of the sources (e.g., resolution, QP, and/or content complexity), a higher bit rate means that the encoding would require a larger number of encoding cycles. Therefore, to optimize the encoding towards the best-possible tradeoffs between quality and number of cycles, a bit-rate-based variable accuracy level encoding system may employ a generally different encoder accuracy level for each encoding, depending on the estimated/expected bit rate. The bit rate estimation depends on the encoding application. For example, in convex-hull-optimized two-pass encoding, or in quality or rate-controlled multi-pass encoding, a different encoder accuracy level could be used as a function of the first-pass bit rate. Even in single-pass encoding, the motion estimation results could be combined with the resolution/QP values to produce a bit rate estimate, which is in turn used to select different encoder accuracy level mode decision and filtering settings. These and other specific encoding applications will be described later in the disclosure; however, the common algorithm is to employ different encoder accuracy level full-encoding or partial-encoding (e.g., mode decision, filtering) settings that depend on the estimated bit rates.

Software video encoding is becoming a popular approach for both video on demand (VOD) and live streaming applications. A bit-rate-based variable accuracy level encoding system may yield at least 10-25% in reductions of central processing unit (CPU) cycles for a same video quality, and it will be the basis for hybrid software (SW)/hardware (HW) solutions towards additional large gains in cycles when using video-HW-assisted CPU products. Cloud companies are looking for any significant savings in cycles (e.g., power/energy), as video has already become a large workload that is straining their growing data centers.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

It is understood that the above descriptions are for purposes of illustration and are not meant to be limiting.

FIG. 1 depicts an illustrative schematic diagram for bit-rate-based variable accuracy level encoding, in accordance with one or more example embodiments of the present disclosure.

Figure 2A:
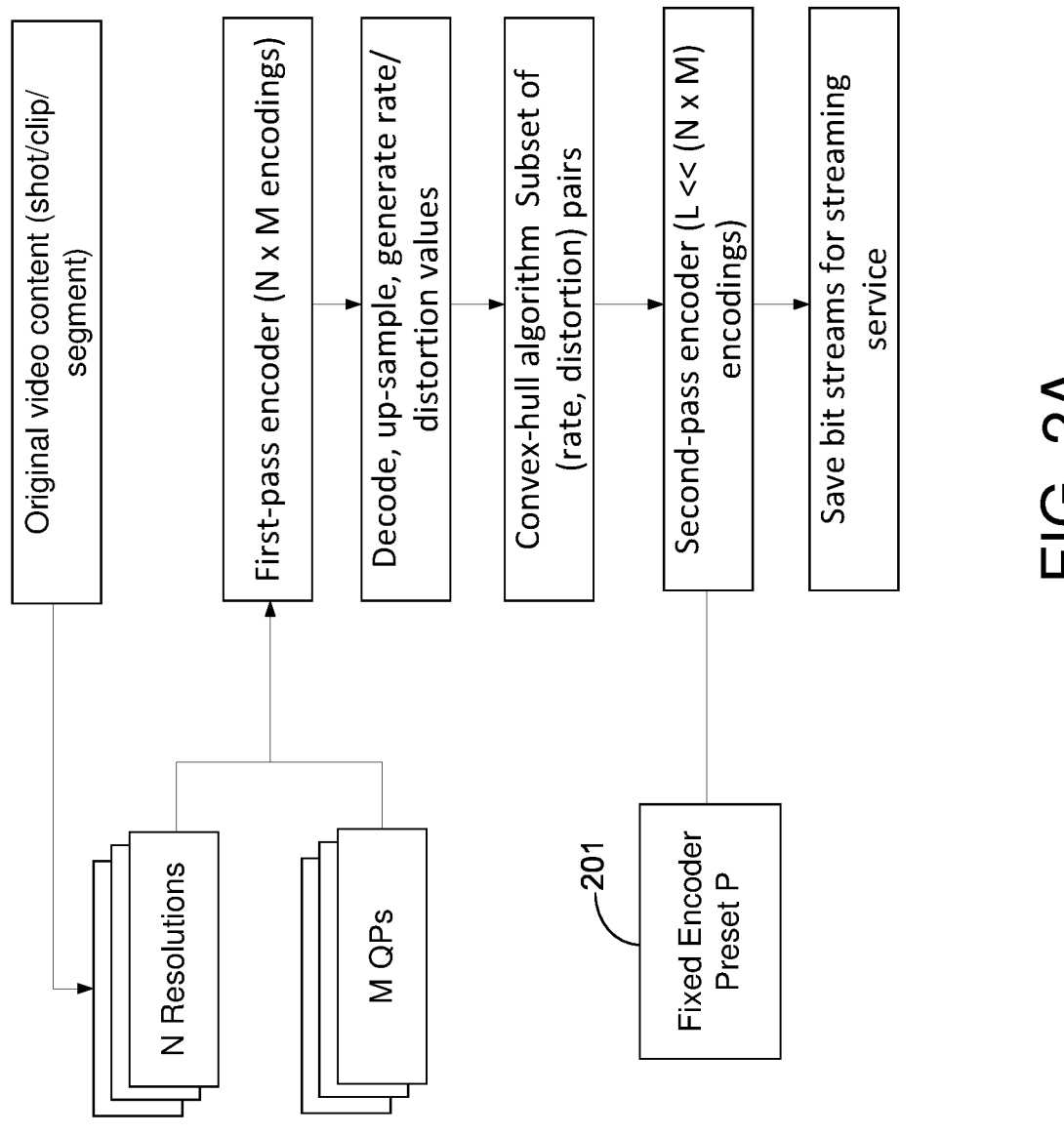
FIG. 2A depicts an illustrative schematic diagram for a two-pass convex-hull-optimized encoder.

Referring to FIG. 2A, there is shown, as a first example application, a two-pass convex-hull-optimized encoder. It should be understood that the two-pass convex-hull-optimized encoder is one example used for illustration purposes only and that the bit-rate-based variable accuracy level encoding system may be applied to other types of encoders (1-pass, multiple-pass encoders, or any other encoder).

First, the original video is downsampled into multiple smaller resolutions (say N resolutions). Each resolution is then encoded by a first-pass encoder at multiple CRFs (or QPs, say M QP values, covering the full QP range). Next, all encoded bit streams are decoded, and all corresponding (rate, distortion) values are produced (N*M points). This algorithm is distortion-metric-agnostic, meaning one could use any metric, such as peak signal-to-noise ratio (PSNR), structural similarity index measurement (SSIM), video multimethod assessment fusion (VMAF), or VMAF-NEG ("NEG" stands for "no enhancement gain"). All the (rate, distortion) values/points are then input into the convex hull algorithm (illustrated in FIG. 2A), which would save/keep the points that yield the best rate-distortion tradeoffs at the target rate levels. Such points are used by a second-pass encoder, operating at a fixed preset P 201, to generate the final streams for the streaming service.

Figure 2B:
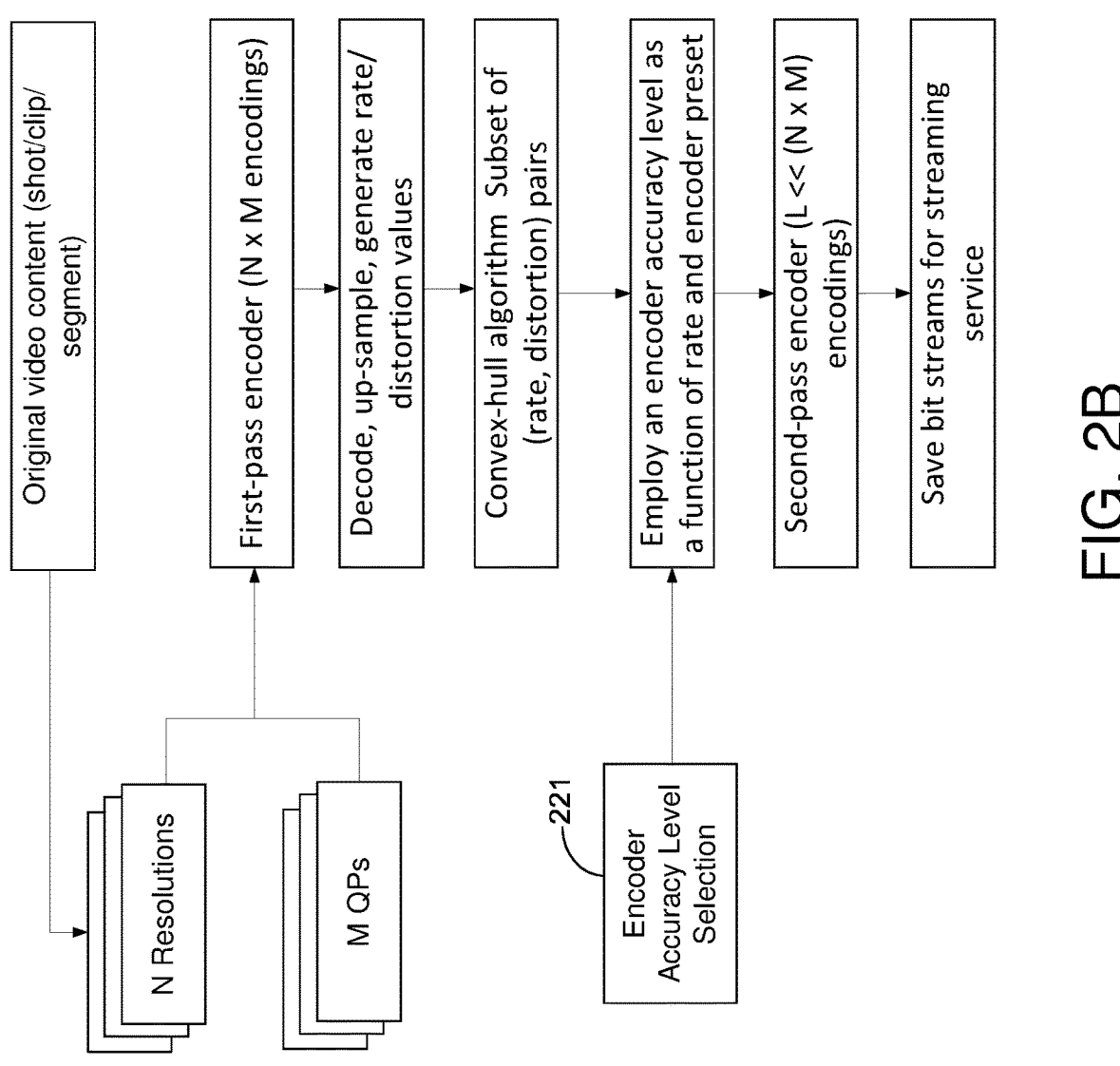
FIG. 2B depicts an illustrative schematic diagram for bit-rate-based variable accuracy level encoding, in accordance with one or more example embodiments of the present disclosure.

Referring to FIG. 2B, a bit-rate-based variable accuracy level encoding system may divide the allowable bit rate range into bands, and assign a different accuracy level 221 of the encoder to each band, which would yield the best tradeoffs between output quality and total number of cycles.

Figure 3A:
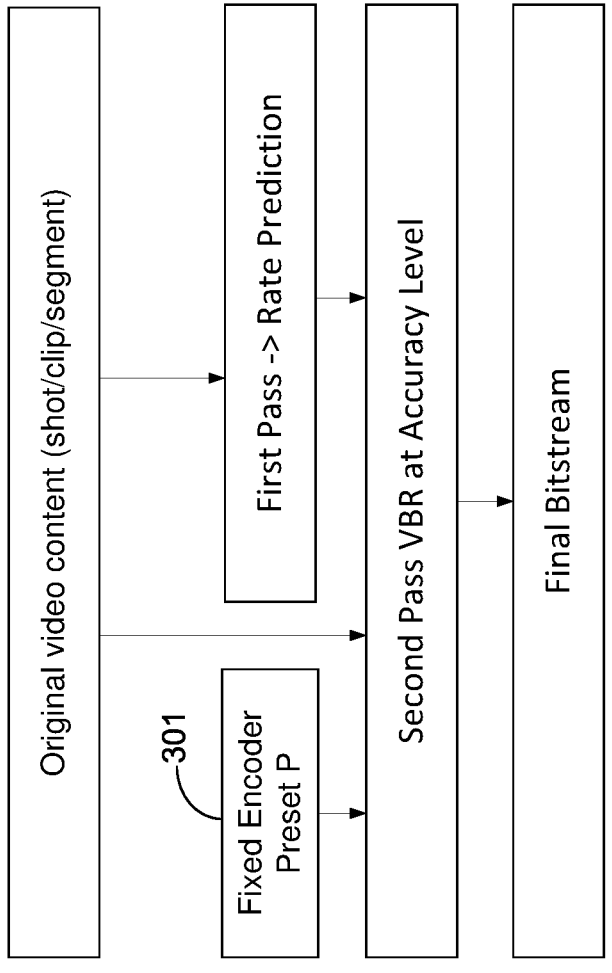
FIG. 3A depicts an illustrative schematic diagram for a two-pass Variable Bit Rate (VBR) encoder.

Referring to FIG. 3A, there is shown a two-pass Variable Bit Rate (VBR) encoder. It should be understood that the two-pass VBR encoder is one example used for illustration purposes only and that the bit-rate-based variable accuracy level encoding system may be applied to other types of encoders (1-pass, multiple-pass encoders, or any other encoder).

First-pass encoding is performed over the whole video shot to analyze the complexity of the shot and produce a bit-prediction for such shot. This bit prediction is then fed to the second-pass encoder, operating at fixed preset P 301, which will encode the video at the specified bitrate.

Figure 3B:
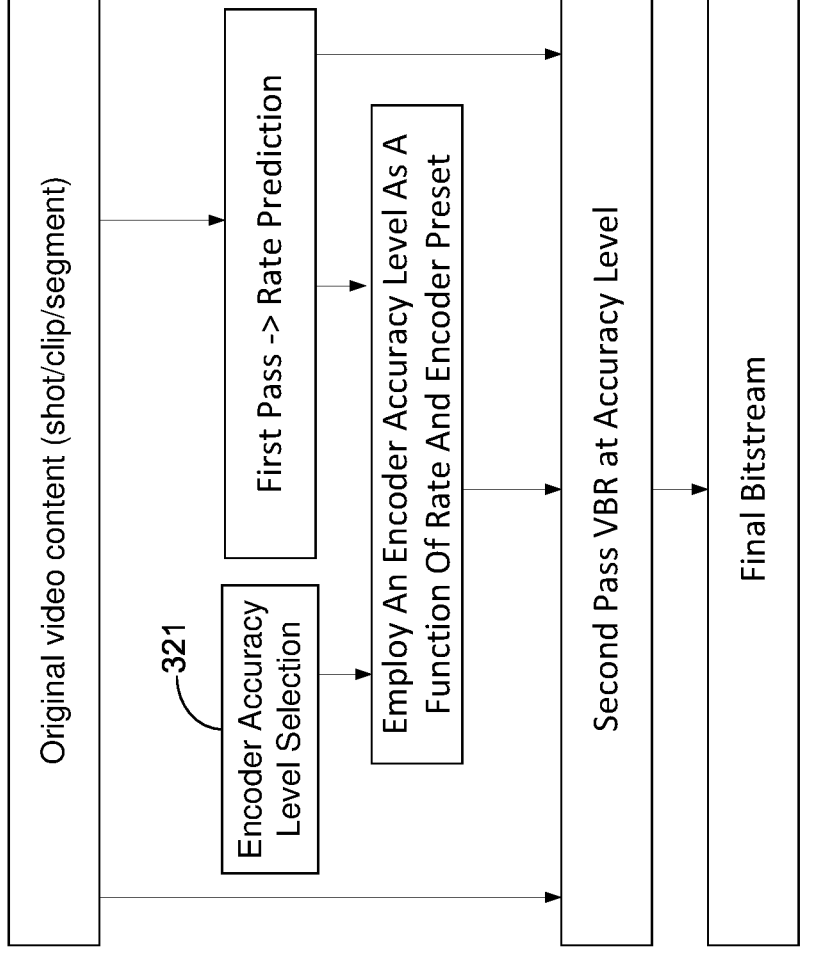
FIG. 3B depicts an illustrative schematic diagram for bit-rate-based variable accuracy level encoding, in accordance with one or more example embodiments of the present disclosure.

Referring to FIG. 3B, a bit-rate-based variable accuracy level encoding system may divide the first pass bit rate range into bands and assign a different encoder accuracy level 321 to each band, in a way that would yield the best tradeoffs between output quality and total number of cycles.

Figure 4A:
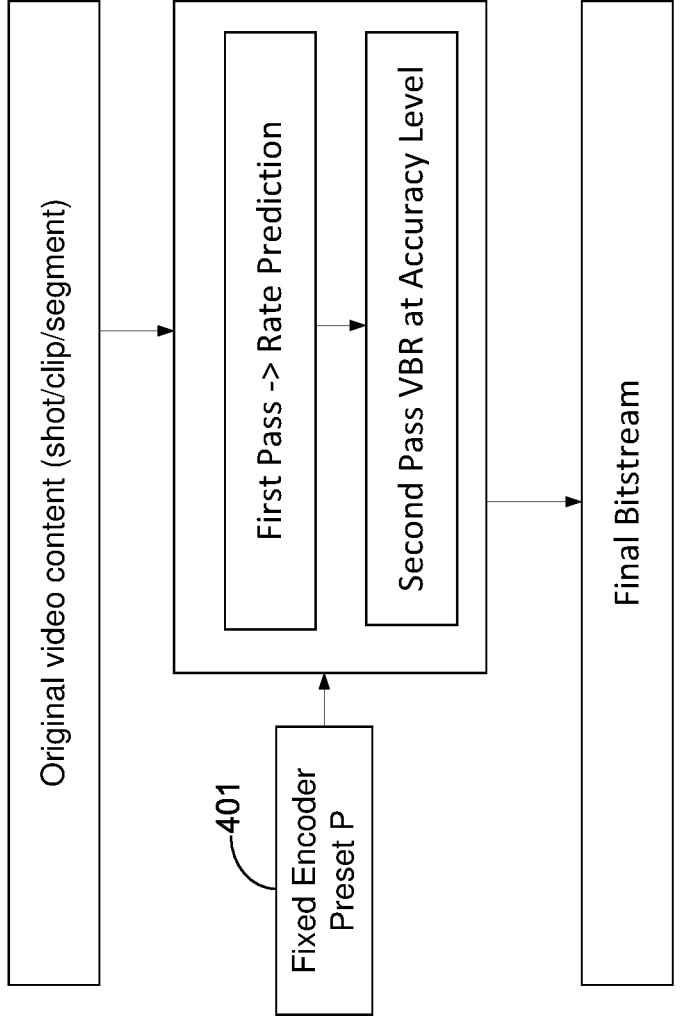
FIG. 4A depicts an illustrative schematic diagram for a one-pass Variable-Bit Rate (VBR) encoder.

Referring to FIG. 4A, there is shown a one-pass Variable-Bit Rate (VBR) encoder. It should be understood that the one-pass VBR encoder is one example used for illustration purposes only and that the bit-rate-based variable accuracy level encoding system may be applied to other types of encoders (2-pass, multiple-pass encoders, or any other encoder).

A Look-ahead analysis process is performed over the delayed group of pictures to analyze the complexity of this video section and produce a bit-prediction for the different frames of this section. This bit prediction is then fed to the rate control module of the encoder, operating at fixed preset P 401, which will encode the video at the specified bitrate.

Figure 4B:
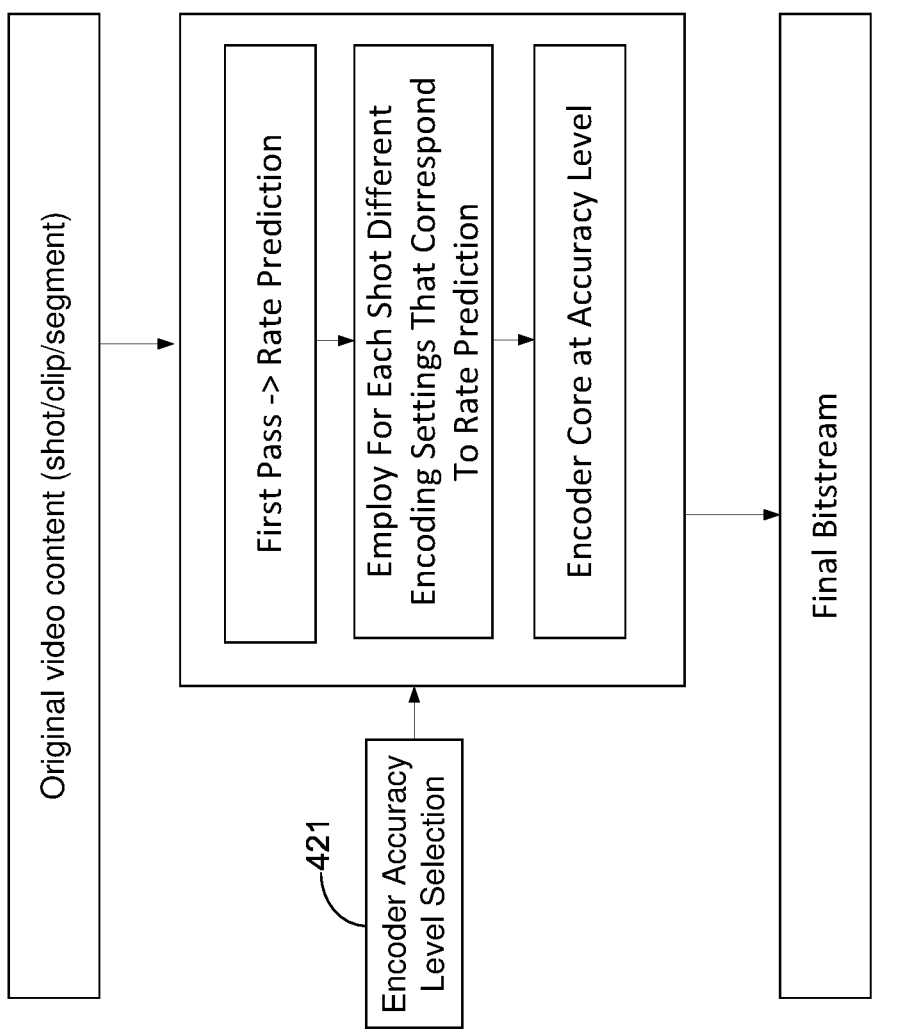
FIG. 4B depicts an illustrative schematic diagram for bit-rate-based variable accuracy level encoding, in accordance with one or more example embodiments of the present disclosure.

Referring to FIG. 4B, a bit-rate-based variable accuracy level encoding system may divide the range of predicted bit rates into bands and assign different accuracy level 421 encoding settings for each band, in a way that would yield the best tradeoffs between quality and total number of cycles. Then, for each video shot/segment/clip, or each group of pictures, or each picture, a bit-rate-based variable accuracy level encoding system may employ encoding settings that correspond to the encoder accuracy level that was assigned to the range that contains the predicted bit rate.

Figure 5A:
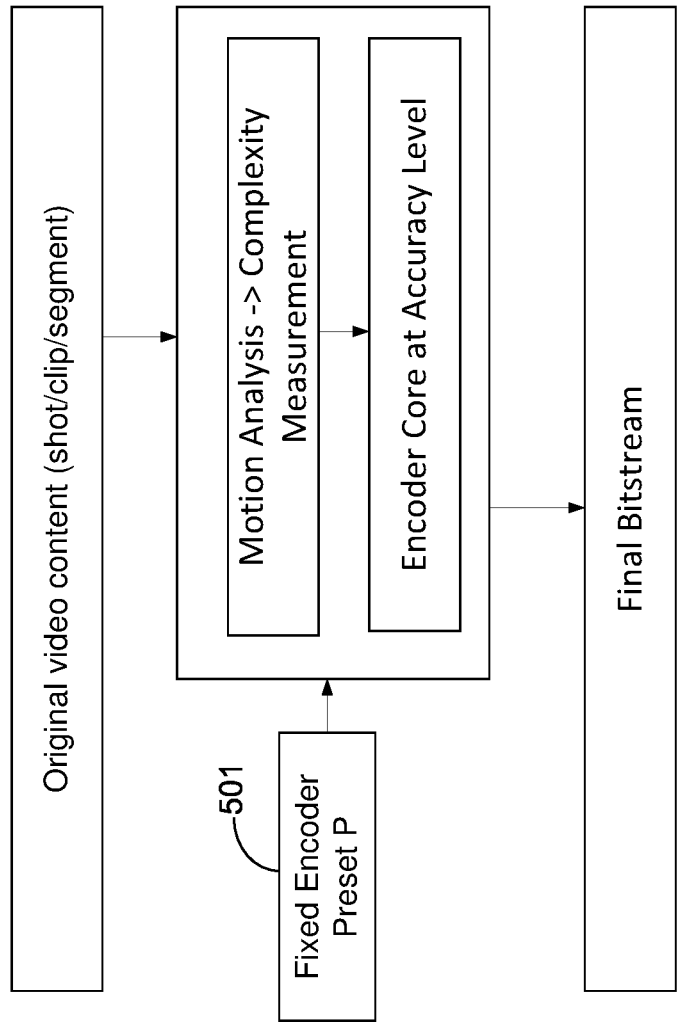
FIG. 5A depicts an illustrative schematic diagram for a one-pass constant rate factor (CRF) encoder with no look-ahead.

Referring to FIG. 5A, there is shown an example for a one-pass constant rate factor (CRF) encoder with no look-ahead. It should be understood that the one-pass CRF encoder is one example used for illustration purposes only and that the bit-rate-based variable accuracy level encoding system may be applied to other types of encoders (1-pass, multiple-pass encoders, or any other encoder).

In a single-pass CRF encoder, with no look-ahead pictures, the motion analysis process is performed for each picture to estimate its video complexity and produce motion estimation results. The complexity estimates and the motion estimation results are then fed to the encoder core, which encodes the video using the preset-specific encoder settings and the specified CRF/QP value.

Figure 5B:
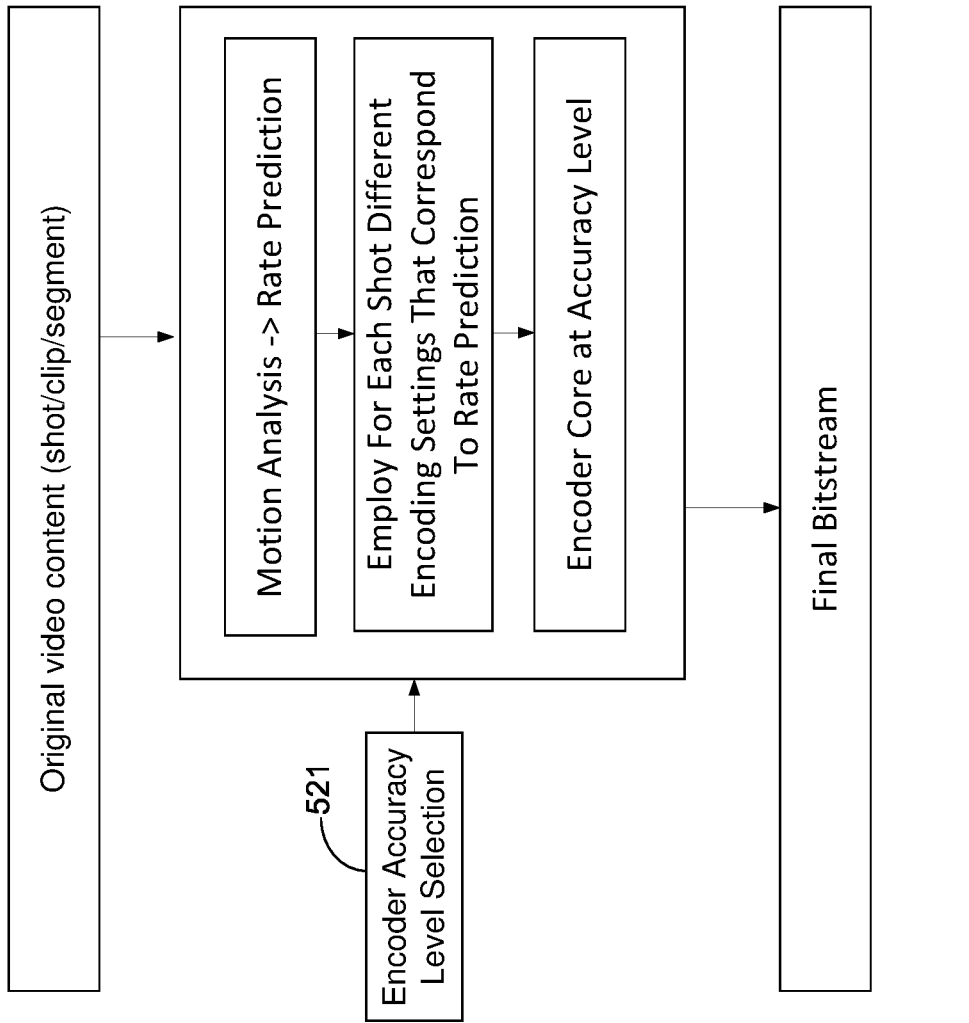
FIG. 5B depicts an illustrative schematic diagram for bit-rate-based variable accuracy level encoding, in accordance with one or more example embodiments of the present disclosure.

Referring to FIG. 5B, a bit-rate-based variable accuracy level encoding system may estimate/predict the rate (bit rate) using the motion estimation distortion and the CRF value, and the estimated rate is then mapped to one of the bands, which allows employing different accuracy level encoding settings for each picture. The rate bands are developed or selected in a way that would yield best tradeoffs between quality and total number of CPU cycles.

It is understood that the above descriptions are for purposes of illustration and are not meant to be limiting.

FIG. 6 illustrates a flow diagram of a process 600 for a bit-rate-based variable accuracy level encoding system, in accordance with one or more example embodiments of the present disclosure.

Figure 7:
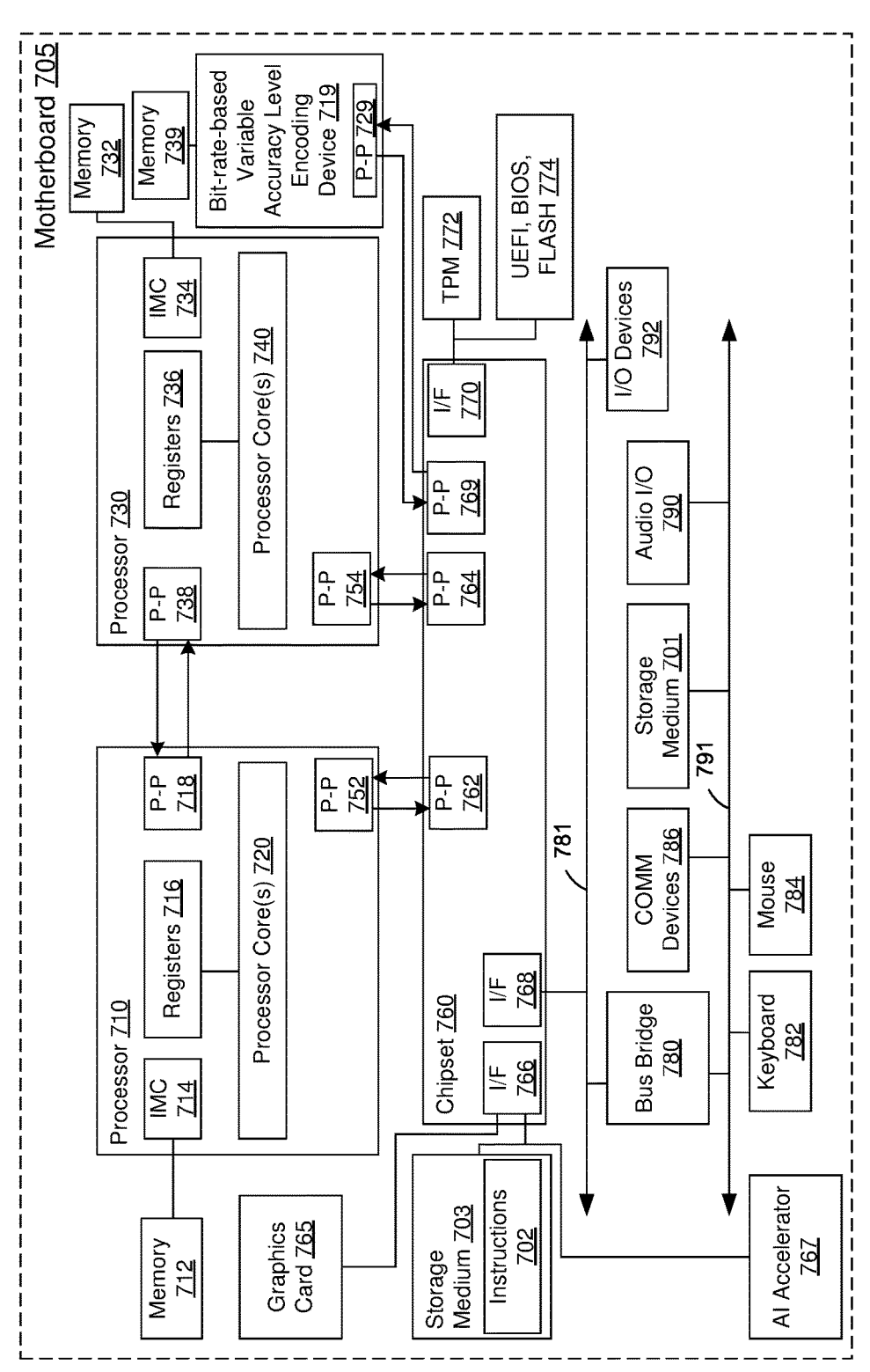
FIG. 7 is a block diagram illustrating an example of a computing device or computing system upon which any of one or more techniques (e.g., methods) may be performed, in accordance with one or more example embodiments of the present disclosure.

At block 602, a device (e.g., the bit-rate-based variable accuracy level encoding device 719 of FIG. 7) may generate a list of encodes based on pairs of resolutions and quantization parameters (QP) associated with one or more video segments received from a source.

At block 604, the device may generate an estimated bit rate associated with the one or more video segments based on an analysis of the one or more video segments.

At block 606, the device may utilize an accuracy level of encoding for an encoder based on the estimated bit rate.

At block 608, the device may encode the one or more video segments based on the accuracy level of encoding.

In one or more embodiments, the device may further divide a range of bit rates into a plurality of bands and/or may assign a different accuracy level of encoding to each band. The device may utilize a decreasing accuracy level of encoding with increasing estimated bit rate. The estimated bit rate increases with increased resolution of the one or more video segments for a same video complexity or QP. The encoder is a two-pass convex-hull-optimized encoder, a two-pass variable bit rate (VBR) encoder, a one-pass VBR encoder, or a one-pass constant rate factor (CRF) encoder. The estimated bit rate increases with a decreased QP of the one or more video segments for a same video complexity or resolution. The estimated bit rate increases with increased complexity of the one or more video segments for a same QP or resolution. The device may further encode the one or more video segments using a first pass encoder and/or decode a resulting bit stream for analysis. The device may generate a bit stream of final encodes to be sent to a streaming service.

It is understood that the above descriptions are for purposes of illustration and are not meant to be limiting.

FIG. 7 illustrates an embodiment of an exemplary system 700, in accordance with one or more example embodiments of the present disclosure.

In various embodiments, the computing system 700 may comprise or be implemented as part of an electronic device.

In some embodiments, the computing system 700 may be representative, for example, of a computer system that implements one or more components of FIG. 6.

The embodiments are not limited in this context. More generally, the computing system 700 is configured to implement all logic, systems, processes, logic flows, methods, equations, apparatuses, and functionality described herein.

The system 700 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores.

The embodiments are not limited in this context. More generally, the computing system 700 is configured to implement all logic, systems, processes, logic flows, methods, equations, apparatuses, and functionality described herein.

The embodiments are not limited in this context. More generally, the computing system 700 is configured to implement all logic, systems, processes, logic flows, methods, equations, apparatuses, and functionality described herein.

Computing system 700 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard 705 for mounting platform components. The motherboard 705 is a point-to-point interconnect platform that includes a processor 710, a processor 730 coupled via a point-to-point interconnects as an Ultra Path Interconnect (UPI), and a bit-rate-based variable accuracy level encoding device 719. In other embodiments, the system 700 may be of another bus architecture, such as a multi-drop bus. Furthermore, each of processors 710 and 730 may be processor packages with multiple processor cores. As an example, processors 710 and 730 are shown to include processor core(s) 720 and 740, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 710 and the chipset 760. Some platforms may include additional components and some platforms may only include sockets to mount the processors and/or the chipset.

The processors 710 and 730 can be any of various commercially available processors, including without limitation an Intel® Celeron®, Core®, Core (2) Duo®, Itanium®, Pentium®, Xcon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 710, and 730.

The processor 710 includes an integrated memory controller (IMC) 714, registers 716, and point-to-point (P-P) interfaces 718 and 752. Similarly, the processor 730 includes an IMC 734, registers 736, and P-P interfaces 738 and 754. The IMC's 714 and 734 couple the processors 710 and 730, respectively, to respective memories, a memory 712 and a memory 732. The memories 712 and 732 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 712 and 732 locally attach to the respective processors 710 and 730.

In addition to the processors 710 and 730, the system 700 may include a bit-rate-based variable accuracy level encoding device 719. The bit-rate-based variable accuracy level encoding device 719 may be connected to chipset 760 by means of P-P interfaces 729 and 769. The bit-rate-based variable accuracy level encoding device 719 may also be connected to a memory 739. In some embodiments, the bit-rate-based variable accuracy level encoding device 719 may be connected to at least one of the processors 710 and 730. In other embodiments, the memories 712, 732, and 739 may couple with the processor 710 and 730, and the bit-rate-based variable accuracy level encoding device 719 via a bus and shared memory hub.

System 700 includes chipset 760 coupled to processors 710 and 730. Furthermore, chipset 760 can be coupled to storage medium 703, for example, via an interface (I/F) 766. The I/F 766 may be, for example, a Peripheral Component Interconnect-enhanced (PCI-e). The processors 710, 730, and the bit-rate-based variable accuracy level encoding device 719 may access the storage medium 703 through chipset 760.

Storage medium 703 may comprise any non-transitory computer-readable storage medium or machine-readable storage medium, such as an optical, magnetic or semiconductor storage medium. In various embodiments, storage medium 703 may comprise an article of manufacture. In some embodiments, storage medium 703 may store computer-executable instructions, such as computer-executable instructions 702 to implement one or more of processes or operations described herein, (e.g., process 600 of FIG. 6). The storage medium 703 may store computer-executable instructions for any equations depicted above. The storage medium 703 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 710 couples to a chipset 760 via P-P interfaces 752 and 762 and the processor 730 couples to a chipset 760 via P-P interfaces 754 and 764. Direct Media Interfaces (DMIs) may couple the P-P interfaces 752 and 762 and the P-P interfaces 754 and 764, respectively. The DMI may be a high-speed interconnect that facilitates, e.g., eight Giga Transfers per second (GT/s) such as DMI 3.0. In other embodiments, the processors 710 and 730 may interconnect via a bus.

The chipset 760 may comprise a controller hub such as a platform controller hub (PCH). The chipset 760 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 760 may comprise more than one controller hub such as a chipset with a memory controller hub, a graphics controller hub, and an input/output (I/O) controller hub.

In the present embodiment, the chipset 760 couples with a trusted platform module (TPM) 772 and the UEFI, BIOS, Flash component 774 via an interface (I/F) 770. The TPM 772 is a dedicated microcontroller designed to secure hardware by integrating cryptographic keys into devices. The UEFI, BIOS, Flash component 774 may provide pre-boot code.

Furthermore, chipset 760 includes the I/F 766 to couple chipset 760 with a high-performance graphics engine, graphics card 765. In other embodiments, the system 700 may include a flexible display interface (FDI) between the processors 710 and 730 and the chipset 760. The FDI interconnects a graphics processor core in a processor with the chipset 760.

Various I/O devices 792 couple to the bus 781, along with a bus bridge 780 which couples the bus 781 to a second bus 791 and an I/F 768 that connects the bus 781 with the chipset 760. In one embodiment, the second bus 791 may be a low pin count (LPC) bus. Various devices may couple to the second bus 791 including, for example, a keyboard 782, a mouse 784, communication devices 786, a storage medium 701, and an audio I/O 790.

The artificial intelligence (AI) accelerator 767 may be circuitry arranged to perform computations related to AI. The AI accelerator 767 may be connected to storage medium 703 and chipset 760. The AI accelerator 767 may deliver the processing power and energy efficiency needed to enable abundant-data computing. The AI accelerator 767 is a class of specialized hardware accelerators or computer systems designed to accelerate artificial intelligence and machine learning applications, including artificial neural networks and machine vision. The AI accelerator 767 may be applicable to algorithms for robotics, internet of things, other data-intensive and/or sensor-driven tasks.

Many of the I/O devices 792, communication devices 786, and the storage medium 701 may reside on the motherboard 705 while the keyboard 782 and the mouse 784 may be add-on peripherals. In other embodiments, some or all the I/O devices 792, communication devices 786, and the storage medium 701 are add-on peripherals and do not reside on the motherboard 705.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second." "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a device comprising processing circuitry coupled to storage, the processing circuitry configured to: generate a list of encodes based on pairs of resolutions and quantization parameters (QP) associated with one or more video segments received from a source; generate an estimated bit rate associated with the one or more video segments based on an analysis of the one or more video segments; utilize an accuracy level of encoding for an encoder based on the estimated bit rate; and encode the one or more video segments based on the accuracy level of encoding.

Example 2 may include the device of example 1 and/or some other example herein, wherein the processing circuitry may be further configured to: divide a range of bit rates into a plurality of bands; and assign a different accuracy level of encoding to each band.

Example 3 may include the device of example 1 and/or some other example herein, wherein the processing circuitry may be further configured to utilize a decreasing accuracy level of encoding with increasing estimated bit rate.

Example 4 may include the device of example 1 and/or some other example herein, wherein the estimated bit rate increases with increased resolution of the one or more video segments for a same video complexity or QP.

Example 5 may include the device of example 1 and/or some other example herein, wherein the encoder may be a two-pass convex-hull-optimized encoder, a two-pass variable bit rate (VBR) encoder, a one-pass VBR encoder, or a one-pass constant rate factor (CRF) encoder.

Example 6 may include the device of example 1 and/or some other example herein, wherein the estimated bit rate increases with a decreased QP of the one or more video segments for a same video complexity or resolution.

Example 7 may include the device of example 1 and/or some other example herein, wherein the estimated bit rate increases with increased complexity of the one or more video segments for a same QP or resolution.

Example 8 may include the device of example 1 and/or some other example herein, wherein to analyze the one or more video segments comprises the processing circuitry being further configured to: encode the one or more video segments using a first pass encoder; and decode a resulting bit stream for analysis.

Example 9 may include the device of example 1 and/or some other example herein, wherein the processing circuitry may be further configured to generate a bit stream of final encodes to be sent to a streaming service.

Example 10 may include a non-transitory computer-readable medium storing computer-executable instructions which when executed by one or more processors result in performing operations comprising: generating a list of encodes based on pairs of resolutions and quantization parameters (QP) associated with one or more video segments received from a source; generating an estimated bit rate associated with the one or more video segments based on an analysis of the one or more video segments; utilizing an accuracy level of encoding for an encoder based on the estimated bit rate; and encoding the one or more video segments based on the accuracy level of encoding.

Example 11 may include the non-transitory computer-readable medium of example 10 and/or some other example herein, wherein the operations further comprise: divide a range of bit rates into a plurality of bands; and assigning a different accuracy level of encoding to each band.

Example 12 may include the non-transitory computer-readable medium of example 10 and/or some other example herein, wherein the operations further comprise utilizing a decreasing accuracy level of encoding with increasing estimated bit rate.

Example 13 may include the non-transitory computer-readable medium of example 10 and/or some other example herein, wherein the estimated bit rate increases with increased resolution of the one or more video segments for a same video complexity or QP.

Example 14 may include the non-transitory computer-readable medium of example 10 and/or some other example herein, wherein the encoder may be a two-pass convex-hull-optimized encoder, a two-pass variable bit rate (VBR) encoder, a one-pass VBR encoder, or a one-pass constant rate factor (CRF) encoder.

Example 15 may include the non-transitory computer-readable medium of example 10 and/or some other example herein, wherein the estimated bit rate increases with a decreased QP of the one or more video segments for a same video complexity or resolution.

Example 16 may include the non-transitory computer-readable medium of example 10 and/or some other example herein, wherein the estimated bit rate increases with increased complexity of the one or more video segments for a same QP or resolution.

Example 17 may include the non-transitory computer-readable medium of example 10 and/or some other example herein, wherein to analyze the one or more video segments comprises the processing circuitry being further configured to: encoding the one or more video segments using a first pass encoder; and decoding a resulting bit stream for analysis.

Example 18 may include the non-transitory computer-readable medium of example 10 and/or some other example herein, wherein the operations further comprise generating a bit stream of final encodes to be sent to a streaming service.

Example 19 may include a method comprising: generating, by one or more processors, a list of encodes based on pairs of resolutions and quantization parameters (QP) associated with one or more video segments received from a source; generating an estimated bit rate associated with the one or more video segments based on an analysis of the one or more video segments; utilizing an accuracy level of encoding for an encoder based on the estimated bit rate; and encoding the one or more video segments based on the accuracy level of encoding.

Example 20 may include the method of example 19 and/or some other example herein, further comprising: divide a range of bit rates into a plurality of bands; and assigning a different accuracy level of encoding to each band.

Example 21 may include the method of example 19 and/or some other example herein, further comprising utilizing a decreasing accuracy level of encoding with increasing estimated bit rate.

Example 22 may include the method of example 19 and/or some other example herein, wherein the estimated bit rate increases with increased resolution of the one or more video segments for a same video complexity or QP.

Example 23 may include the method of example 19 and/or some other example herein, wherein the encoder may be a two-pass convex-hull-optimized encoder, a two-pass variable bit rate (VBR) encoder, a one-pass VBR encoder, or a one-pass constant rate factor (CRF) encoder.

Example 24 may include the method of example 19 and/or some other example herein, wherein the estimated bit rate increases with a decreased QP of the one or more video segments for a same video complexity or resolution.

Example 25 may include the method of example 19 and/or some other example herein, wherein the estimated bit rate increases with increased complexity of the one or more video segments for a same QP or resolution.

Example 26 may include the method of example 19 and/or some other example herein, wherein to analyze the one or more video segments comprises the processing circuitry being further configured to: encoding the one or more video segments using a first pass encoder; and decoding a resulting bit stream for analysis.

Example 27 may include the method of example 19 and/or some other example herein, further comprising generating a bit stream of final encodes to be sent to a streaming service.

Example 28 may include an apparatus comprising means for: generating a list of encodes based on pairs of resolutions and quantization parameters (QP) associated with one or more video segments received from a source; generating an estimated bit rate associated with the one or more video segments based on an analysis of the one or more video segments; utilizing an accuracy level of encoding for an encoder based on the estimated bit rate; and encoding the one or more video segments based on the accuracy level of encoding.

Example 29 may include the apparatus of example 28 and/or some other example herein, further comprising:

divide a range of bit rates into a plurality of bands; and assigning a different accuracy level of encoding to each band.

Example 30 may include the apparatus of example 28 and/or some other example herein, further comprising utilizing a decreasing accuracy level of encoding with increasing estimated bit rate.

Example 31 may include the apparatus of example 28 and/or some other example herein, wherein the estimated bit rate increases with increased resolution of the one or more video segments for a same video complexity or QP.

Example 32 may include the apparatus of example 28 and/or some other example herein, wherein the encoder may be a two-pass convex-hull-optimized encoder, a two-pass variable bit rate (VBR) encoder, a one-pass VBR encoder, or a one-pass constant rate factor (CRF) encoder.

Example 33 may include the apparatus of example 28 and/or some other example herein, wherein the estimated bit rate increases with a decreased QP of the one or more video segments for a same video complexity or resolution.

Example 34 may include the apparatus of example 28 and/or some other example herein, wherein the estimated bit rate increases with increased complexity of the one or more video segments for a same QP or resolution.

Example 35 may include the apparatus of example 28 and/or some other example herein, wherein to analyze the one or more video segments comprises the processing circuitry being further configured to: encoding the one or more video segments using a first pass encoder; and decoding a resulting bit stream for analysis.

Example 36 may include the apparatus of example 28 and/or some other example herein, further comprising generating a bit stream of final encodes to be sent to a streaming service.

Example 37 may include a system that comprises at least one memory that stores computer-executable instructions; and at least one processor configured to access the at least one memory and execute the computer-executable instructions to: receive one or more video segments; assign different presets for each encoding based on an estimated or expected bit rate; and encode the one more video segments based on the different presets.

Example 38 may include the system of example 37 and/or some other example herein, wherein the estimated or expected bit rate depends on and encoding application.

Example 39 may include the system of example 38 and/or some other example herein, wherein the encoding application comprises a convex-hull-optimized two-pass encoding, or in quality- or rate-controlled multi-pass encoding.

Example 40 may include a non-transitory computer-readable medium storing computer-executable instructions which when executed by one or more processors result in performing operations comprising: receiving one or more video segments; assigning different presets for each encoding based on an estimated or expected bit rate; and encoding the one more video segments based on the different presets.

Example 41 may include the non-transitory computer-readable medium of example 4 and/or some other example herein, wherein the estimated or expected bit rate depends on and encoding application.

Example 42 may include the non-transitory computer-readable medium of example 5 and/or some other example herein, wherein the encoding application comprises a convex-hull-optimized two-pass encoding, or in quality- or rate-controlled multi-pass encoding.

Example 43 may include a method comprising: receiving, by one or more processors, one or more video segments;

assigning different presets for each encoding based on an estimated or expected bit rate; and encoding the one more video segments based on the different presets.

Example 44 may include the method of example 7 and/or some other example herein, wherein the estimated or expected bit rate depends on and encoding application.

Example 45 may include the method of example 8 and/or some other example herein, wherein the encoding application comprises a convex-hull-optimized two-pass encoding, or in quality- or rate-controlled multi-pass encoding.

Example 46 may include an apparatus comprising means for: receiving one or more video segments; assigning different presets for each encoding based on an estimated or expected bit rate; and encoding the one more video segments based on the different presets.

Example 47 may include the apparatus of example 46 and/or some other example herein, wherein the estimated or expected bit rate depends on and encoding application.

Example 48 may include the apparatus of example 47 and/or some other example herein, wherein the encoding application comprises a convex-hull-optimized two-pass encoding, or in quality- or rate-controlled multi-pass encoding.

Example 49 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 50 may include an apparatus comprising logic, modules, and/or circuitry to perform one or more elements of a method described in or related to any of examples 1-36, or any other method or process described herein.

Example 51 may include a method, technique, or process as described in or related to any of examples 1-36, or portions or parts thereof.

Example 52 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 53 may include a method of communicating in a wireless network as shown and described herein.

Example 54 may include a system for providing wireless communication as shown and described herein.

Example 55 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
   interface circuitry;
   instructions; and
   at least one processor circuit to be programmed based on the instructions to:
   generate respective initial encoded bitstreams for a video segment based on corresponding pairs of resolutions and quantization parameters (QPs);
   generate pairs of estimated bit rates and distortion values associated respectively with the initial encoded bitstreams;
   select, based on the pairs of estimated bit rates and distortion values, a subset of the pairs of resolutions and QPs to associate respectively with a plurality of target bit rates; and
   encode the video segment based on (i) encoder accuracy levels associated respectively with the target bit rates and (ii) the subset of the pairs of resolutions and QPs to generate respective final encoded bitstreams for the video segment at the target bit rates.

2. The device of claim 1, wherein one or more of the at least one processor circuit is to:
   divide a range of bit rates into a plurality of bands; and
   assign respective ones of the encoder accuracy levels to corresponding ones of the bands.

3. The device of claim 1, wherein one or more of the at least one processor circuit is to assign the encoder accuracy levels to cause decreasing encoder accuracy levels to be utilized with increasing estimated bit rates.

4. The device of claim 1, wherein the estimated bit rates increase with increased resolutions used to encode the video segment for a same video complexity or a same QP.

5. The device of claim 1, wherein one or more of the at least one processor circuit is to encode the video segment based on at least one of a two-pass convex-hull-optimized encoder, a two-pass variable bit rate (VBR) encoder, a one-pass VBR encoder, or a one-pass constant rate factor (CRF) encoder.

6. The device of claim 1, wherein the estimated bit rates increase with decreased QPs used to encode the video segment for a same video complexity or a same resolution.

7. The device of claim 1, wherein the estimated bit rates increase with increased complexity of the video segment for a same QP or a same resolution.

8. The device of claim 1, wherein one or more of the at least one processor circuit is to:

encode the video segment based on a first pass encoder to generate the respective initial encoded bitstreams; and decode the initial encoded bitstreams to generate the pairs of estimated bit rates and distortion values.

9. The device of claim 1, wherein one or more of the at least one processor circuit is to cause the final encoded bitstreams to be sent to a streaming service.

10. A non-transitory computer-readable medium comprising computer-executable instructions to cause at least one processor circuit to at least:

generate respective initial encoded bitstreams for a video segment based on corresponding pairs of resolutions and quantization parameters (QPs);

generate pairs of estimated bit rates and distortion values associated respectively with the initial encoded bitstreams;

select, based on the pairs of estimated bit rates and distortion values, a subset of the pairs of resolutions and QPs to associate respectively with a plurality of target bit rates; and encode the video segment based on (i) encoder accuracy levels associated respectively with the target bit rates and (ii) the subset of the pairs of resolutions and QPs to generate respective final encoded bitstreams for the video segment at the target bit rates.

11. The non-transitory computer-readable medium of claim 10, wherein the instructions are to cause one or more of the at least one processor circuit to:

divide a range of bit rates into a plurality of bands; and assign respective ones of the encoder accuracy levels to corresponding ones of the bands.

12. The non-transitory computer-readable medium of claim 10, wherein the instructions are to cause one or more of the at least one processor circuit to assign the encoder accuracy levels to cause decreasing encoder accuracy levels to be utilized with increasing estimated bit rates.

13. The non-transitory computer-readable medium of claim 10, wherein the estimated bit rates increase with increased resolutions used to encode the video segment for a same video complexity or a same QP.

14. The non-transitory computer-readable medium of claim 10, wherein the instructions are to cause one or more of the at least one processor circuit to encode the video segment based on at least one of a two-pass convex-hulloptimized encoder, a two-pass variable bit rate (VBR) encoder, a one-pass VBR encoder, or a one-pass constant rate factor (CRF) encoder.

15. The non-transitory computer-readable medium of claim 10, wherein the estimated bit rates increase with decreased QPs used to encode the video segment for a same video complexity or a same resolution.

16. The non-transitory computer-readable medium of claim 10, wherein the estimated bit rates increase with increased complexity of the video segment for a same QP or a same resolution.

17. The non-transitory computer-readable medium of claim 10, wherein the instructions are to cause one or more of the at least one processor circuit to:

encode the video segment based on a first pass encoder to generate the respective initial encoded bitstreams; and decode the initial encoded streams to generate the pairs of estimated bit rates and distortion values.

18. The non-transitory computer-readable medium of claim 10, wherein the instructions are to cause one or more of the processor circuit to cause the final encoded bitstreams to be sent to a streaming service.

19. A method comprising:

generating respective initial encoded bitstreams for a video segment based on corresponding pairs of resolutions and quantization parameters (QPs);

generating, by at least one processor circuit based on at least instructions, pairs of estimated bit rates and distortion values associated respectively with the initial encoded bitstreams;

selecting, by one or more of the at least one processor circuit based on the pairs of estimated bit rates and distortion values, a subset of the pairs of resolutions and QPs to associate respectively with a plurality of target bit rates; and encoding the video segment based on (i) encoder accuracy levels associated respectively with the target bit rates and (ii) the subset of the pairs of resolutions and QPs to generate respective final encoded bitstreams for the video segment at the target bit rates.

20. The method of claim 19, including:

dividing a range of bit rates into a plurality of bands; and assigning respective ones of the encoder accuracy levels to corresponding ones of the bands.

* * * * *